United States Patent
Loecherer

(10) Patent No.: US 11,383,673 B2
(45) Date of Patent: Jul. 12, 2022

(54) DEFLECTING DEVICE FOR A SAFETY BELT

(71) Applicant: Bayerische Motoren Werke Aktiengesellschaft, Munich (DE)

(72) Inventor: Andreas Loecherer, Buchloe (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/757,044

(22) PCT Filed: Oct. 18, 2018

(86) PCT No.: PCT/EP2018/078601
§ 371 (c)(1),
(2) Date: Apr. 17, 2020

(87) PCT Pub. No.: WO2019/077060
PCT Pub. Date: Apr. 25, 2019

(65) Prior Publication Data
US 2020/0331425 A1    Oct. 22, 2020

(30) Foreign Application Priority Data

Oct. 18, 2017 (DE) ............... 10 2017 218 625.9

(51) Int. Cl.
*B60R 22/24* (2006.01)
*B60R 22/18* (2006.01)

(52) U.S. Cl.
CPC ...... *B60R 22/24* (2013.01); *B60R 2022/1818* (2013.01)

(58) Field of Classification Search
CPC ............... B60R 2022/1818; B60R 2022/1843
See application file for complete search history.

(56) References Cited

U.S. PATENT DOCUMENTS

| 5,308,148 | A | 5/1994 | Peterson et al. |
| 9,855,872 | B2 * | 1/2018 | Supernavage ....... B60N 2/0843 |
| 2003/0020272 | A1 | 1/2003 | Yoshino et al. |
| 2004/0084952 | A1 | 5/2004 | Janz |
| 2007/0114777 | A1 * | 5/2007 | Gray ...................... B60R 22/24 |
| | | | 280/808 |

(Continued)

FOREIGN PATENT DOCUMENTS

| CN | 102649418 A | 8/2012 |
| DE | 33 41 080 A1 | 5/1985 |

(Continued)

OTHER PUBLICATIONS

International Search Report (PCT/ISA/210) issued in PCT Application No. PCT/EP2018/078601 dated Dec. 11, 2018 with English translation (six (6) pages).

(Continued)

*Primary Examiner* — Nicole T Verley
(74) *Attorney, Agent, or Firm* — Crowell & Moring LLP

(57) ABSTRACT

A deflecting device for a safety belt in a motor vehicle includes a belt deflection element, which is designed to deflect a safety belt brought from a first direction in a second direction. The belt deflection element is formed on a molded part, and a belt guiding element is provided on the molded part and directs the safety belt brought onto the molded part towards the belt deflection element.

13 Claims, 6 Drawing Sheets

(56) References Cited

U.S. PATENT DOCUMENTS

| | | | | |
|---|---|---|---|---|
| 2007/0138783 A1* | 6/2007 | Gleason | ............... | B60R 22/24 |
| | | | | 280/808 |
| 2008/0030013 A1* | 2/2008 | Burghardt | ............... | B60R 22/26 |
| | | | | 280/808 |
| 2008/0054703 A1* | 3/2008 | Okazaki | ............... | B60R 22/26 |
| | | | | 297/483 |
| 2012/0217787 A1 | 8/2012 | Adolfsson et al. | | |
| 2018/0370482 A1* | 12/2018 | Tago | ............... | B60N 2/688 |

FOREIGN PATENT DOCUMENTS

| | | | | | |
|---|---|---|---|---|---|
| DE | 4211471 A1 * | 10/1992 | ............ | B60R 22/26 |
| DE | 10200104 A1 * | 7/2003 | ............ | B60R 22/26 |
| DE | 10 2014 104 435 A1 | 5/2015 | | |
| EP | 1338486 A2 * | 8/2003 | ............ | B60R 22/26 |
| JP | 59-177448 A | 10/1984 | | |
| JP | 4-159162 A | 6/1992 | | |
| JP | 2006-297984 A | 11/2006 | | |
| JP | 2012-240432 A | 12/2012 | | |

OTHER PUBLICATIONS

German-language Written Opinion (PCT/ISA/237) issued in PCT Application No. PCT/EP2018/078601 dated Dec. 11, 2018 (eight (8) pages).

German-language Search Report issued in German Application No. 102017218625.9 dated Jul. 2, 2018 with partial English translation (13 pages).

English translation of Chinese-language Office Action issued in Chinese Application No. 201880066843.8 dated Oct. 11, 2021 (6 pages).

* cited by examiner

DEFLECTING DEVICE FOR A SAFETY BELT

BACKGROUND AND SUMMARY OF THE INVENTION

The invention relates to a deflecting device for a safety belt. It also relates to a motor vehicle having at least one safety belt arrangement that has a deflecting device for a safety belt.

Safety belts are an essential constituent of a restraint concept for passengers of motor vehicles, the protective effect of which, in addition to the safety belts that are usually in the form of three-point automatic belts, is achieved mainly by airbags and deformation elements in the vehicle interior. Three-point automatic belts are equipped with a winding roller arrangement for the belt webbing, which in normal operation allows the belt webbing to be wound up and unwound and, in the event of unusual acceleration, prevents the unwinding of the belt webbing. The winding roller arrangement can be supported by a belt tensioner device, which retracts the belt webbing by a particular amount in order to fix a person who is sitting on an associated vehicle seat and secured by the safety belt firmly to the vehicle seat in the event of an accident. Moreover, the winding roller arrangement can be provided with a belt force limiter, in order to allow defined unwinding of the belt webbing in the event of a collision, in order as a result to limit the belt force that acts on a person secured by the safety belt.

The winding roller arrangement is usually provided in the lower or lateral region of the vehicle structure and connected to the latter or arranged in the lower region of the vehicle seat. Starting from the winding roller arrangement, the belt webbing is guided upward in the direction of the upper end of the backrest of the associated vehicle seat and is guided there to the shoulder of the person sitting on the vehicle seat by means of an upper deflecting device. From there, the belt webbing is guided, as a shoulder belt portion, over the thorax of the person as far as a deflection at a belt tongue, which cooperates with a belt buckle attached to the vehicle structure or to the vehicle seat. From the deflection at the belt tongue, the belt webbing extends over the person's pelvis as a lap belt portion as far as a belt end fastener attached to the vehicle structure or the vehicle seat.

The upper deflecting device serves to allow an optimal route of the belt webbing over the person's shoulder and thus an optimal route of the shoulder belt portion over the upper body of the majority of potential vehicle passengers ("percentiles"), regardless of their height. Without such an upper deflection of the belt webbing, it is not possible to ensure an ideal belt webbing route for all percentiles.

For the front single seats of a vehicle, use is predominantly made of deflecting devices that each consist of a bent wire, the ends of which have been welded together ("bent wire geometry"), wherein the deflecting device is mounted in a pivotable manner on the lateral vehicle structure, for example on the A-, B- or C-pillar of the vehicle, or on the backrest, usually in a height-adjustable manner. For the rear outer seats of a vehicle, the upper deflecting devices are formed frequently as plastics molded parts in the upper region of the backrest or in an interior side panel.

In the case of deflecting devices made of plastic, in which there is extensive contact between the belt webbing and the surface of the deflecting device, there is the risk of the belt webbing fusing together with the deflecting device in the event of too rapid a relative movement with respect to the deflecting device. Deflecting devices made of bent wire geometries are, by contrast, expensive and the attachment thereof to the seat structure or vehicle structure, the strength thereof, and the configuration thereof with respect to interfaces, for example to the interior trim, is in each case difficult to realize.

DE 10 2014 104 435 A1 shows and describes a deflecting device for a safety belt in a motor vehicle, which is attached to the motor vehicle structure next to the backrest of a rear bench seat. This previously known deflecting device is formed by a three-dimensional bent wire construction, which deflects the belt either into a forwardly directed non-use position or into a use position directed toward the backrest.

The object of the invention is to configure a generic deflecting device for a safety belt in such a way that it is cost-effective to produce and can be employed without problems even in the region of the outer seats of a rear bench seat or of rear single seats.

The deflecting device according to the invention for a safety belt, in particular for a safety belt in a motor vehicle, having a belt deflecting element, which is configured to deflect a safety belt introduced from a first direction into a second direction, is distinguished by the fact that the belt deflecting element is formed on a molded part and that at least one belt run-on element is provided on the molded part, said belt run-on element directing the safety belt introduced onto the molded part toward the belt deflecting element.

In this case, the belt run-on element is at least as wide as the safety belt, in order for it to be possible to introduce the belt webbing over its entire width into the deflecting device, without the edges of the belt webbing running on the deflecting device. On the other hand, the width of the belt run-on element is, according to the invention, only slightly greater than the width of the belt webbing. The width of the belt run-on element is preferably at most 1.5 times the width of the belt webbing.

Preferably, the width of the belt run-on element is at least 1.1 times the width of the belt webbing.

Further preferably, the width of the belt run-on element is at least 1.2 times the width of the belt webbing.

Further preferably, the width of the belt run-on element is at most 1.4 times the width of the belt webbing.

Further preferably, the width of the belt run-on element is at most 1.3 times the width of the belt webbing.

The width of the belt deflecting element is, according to the invention, much greater than the width of the belt run-on element. The width of the belt deflecting element is, according to the invention, at least 2 times the width of the belt webbing. Preferably, the width of the belt deflecting element is no more than 5 times the width of the belt webbing.

Preferably, the width of the belt deflecting element is at least 2.5 times the width of the belt webbing.

Further preferably, the width of the belt deflecting element is at least 3 times the width of the belt webbing.

Further preferably, the width of the belt deflecting element is at most 4.5 times the width of the belt webbing.

Further preferably, the width of the belt deflecting element is at most 4 times the width of the belt webbing.

The expression "width of the belt deflecting element" should not be understood in the strictly geometric meaning as being a simple widthwise extension, but as the path along which the belt webbing can shift on the belt deflecting element.

The deflecting device in the form of a molded part has, according to the invention, a dual run-on geometry for the belt webbing, with a lower belt run-on element and an upper belt deflecting element. The lower belt run-on element serves to pre-orient the belt webbing fed by the winding roller arrangement, this having the effect that the belt webbing runs in an orderly and smooth manner to the belt deflecting element, partially around the latter and from there to the shoulder region of the passenger. The belt run-on element and/or the belt deflecting element can in this case be provided preferably with a friction-reducing surface coating, with the result that the deflecting device is particularly suitable as a belt tensioner.

As a result of the limited width of the belt run-on element, precise guiding of the belt webbing at the "inlet" of the deflecting device is achieved. This prevents the edges of the belt webbing from running on the exit guide of the winding roller arrangement. Furthermore, as a result of the invention, the traction direction of the belt webbing remains as parallel to the orientation of the winding roller arrangement as possible.

As a result of the width of the belt deflecting element being much greater according to the invention than the width of the belt run-on element, the belt webbing emerging from the deflecting device can be adapted in terms of exit angle to the height and/or stature and/or posture of the occupant, in that the belt webbing can shift along the widthwise extension of the belt deflecting element. Therefore, the percentiles of occupants that are decisive for the configuration of a motor vehicle (from the "5% woman" to the "95% man", as they are known) are covered as regards the belt webbing guide, since the belt webbing emerging from the belt deflecting element can be adapted in terms of its exit angle from the deflecting device to the height and to the stature of the occupant. The occupant has the option of determining the belt webbing route themselves by "adjusting" the belt webbing, depending on personal perception and/or individual posture. In this way, for example, uncomfortable contact of the belt webbing with the neck region of a comparatively small occupant is counteracted and the belt webbing is moved into a comfortable route passing over the collarbone instead.

Moreover, as a result of the belt webbing being able to shift along the widthwise extension of the belt deflecting element, the belt webbing can adopt the shortest connection between the deflecting device and the occupant's body in the event of a crash, when a belt tensioner device pulls the belt webbing in the direction of the winding roller arrangement and in the process the belt webbing runs along the width of the belt deflecting element.

Preferably, the molded part is formed from a sheet, for example a metal sheet, wherein the molded part of a particularly preferred embodiment is a deep-drawn part.

The deflecting device having a molded part in the form of a deep-drawn part can be adapted individually to the structural environment in the vehicle interior, and thus simplifies the configuration with respect to structural interfaces. Only the producibility and the capacity for deep drawing of the material limit practicability here. The molded part can be configured in an optimized manner in terms of weight and strength by means of simulation. The behavior in conjunction with the pyrotechnic belt tensioner is predictable and robust. As a result of the free scope for design within the limits of producibility, a geometric design that is optimized in terms of the belt winding-up and belt retraction behavior is possible. It is also possible for an ideal belt webbing route for the different percentiles to be implemented.

In one advantageous embodiment of the invention, which is combinable with other embodiments, the belt deflecting element is formed at an upper edge of the molded part. In this case, it is particularly advantageous for the upper edge of the molded part to be rolled.

It is also advantageous when the belt run-on element is formed at a lower edge of the molded part. Preferably, in this case, the lower edge of the molded part is rolled.

It is particularly advantageous when a central connecting structure, preferably a connecting face, of the molded part extends between the upper rolled edge and the lower rolled edge, and when at least one belt guiding portion of the belt deflecting element and at least one belt guiding portion of the belt run-on element protrude beyond the connecting structure. This configuration has the effect that the belt webbing rests only on the rolled edges and not also on the connecting structure, with the result that frictional resistance between the deflecting device and the molded part is minimized, in particular when the contact faces between the belt webbing and molded part are coated in a friction-reducing manner.

Also of particularly advantage is an embodiment of the invention in which the belt deflecting element, in particular the upper rolled edge, is curved in an arcuate manner about the provided running direction of the belt webbing. This arcuate curvature makes it possible not only to deflect the belt route out of its first route plane between the winding roller arrangement and the deflecting device and into a second route plane between the deflecting device and the shoulder of the passenger, but also to pivot it about a vertical axis.

The arcuate curvature can have a constant or varying radius along the widthwise extension of the belt deflecting element. In the variant with a varying radius of curvature, the exit angle of the belt webbing from the deflecting device can be adapted in a particularly individual manner to the conditions of the motor vehicle and the percentiles of occupants to be covered.

In addition to the arcuate configuration of the belt deflecting element, an L-shaped configuration is also possible for example.

The deflecting device can be arranged both in a manner fixed to the body (i.e. to the body shell of the motor vehicle) and in a manner fixed to the seat (i.e. to the back seat of the motor vehicle).

In principle, it is possible for the belt deflecting element to be designed in an identical or at least similar manner across a plurality of different models of motor vehicles of a manufacturer. This results in cost-effective production.

The belt run-on element of the deflecting device can be oriented optimally with respect to the belt webbing feed, depending on the positioning of the winding roller arrangement and deflecting device. This supply of the belt webbing from the winding roller arrangement is different depending on the model of the motor vehicle, depending on the spatial conditions, resulting in different angles for the feed of the belt webbing.

In a configuration of the invention, the central axes of the belt run-on element and belt deflecting element are skew with respect to one another. In the context of the present invention, the "central axis" should be understood as being the connection of the two end points of the belt run-on element and belt deflecting element, respectively, i.e., for example, in the case of an arcuate belt deflecting element, the chord between the two end points of the belt deflecting element. As a result, it is possible to orient the belt deflection optimally with respect to a comfortable route of the belt webbing over the occupant, regardless of the positioning of the winding roller arrangement on the body of the motor vehicle. The skew arrangement of the central axes is easily possible when the deflecting device is produced by a deep-drawing process.

In principle, the invention makes it possible to deflect the belt webbing into any desired direction of the belt webbing exit, virtually independently of the original direction of the belt webbing upon entering the deflecting device.

The deflecting device consists preferably of only one component, without moving parts. This results in easy producibility with low costs and high loading capacity and functional reliability.

As a result of the belt webbing being guided between the belt run-on element and belt deflecting element without the belt webbing resting on another surface of the deflecting device in between, the belt webbing runs without folds and without distortions.

The invention is also directed at a motor vehicle having at least one safety belt arrangement that has a deflecting device according to the invention.

Preferred exemplary embodiments of the invention with additional design details and further advantages are explained and described in more detail in the following text with reference to the accompanying drawing.

DETAILED DESCRIPTION OF THE DRAWINGS

Figure 1:
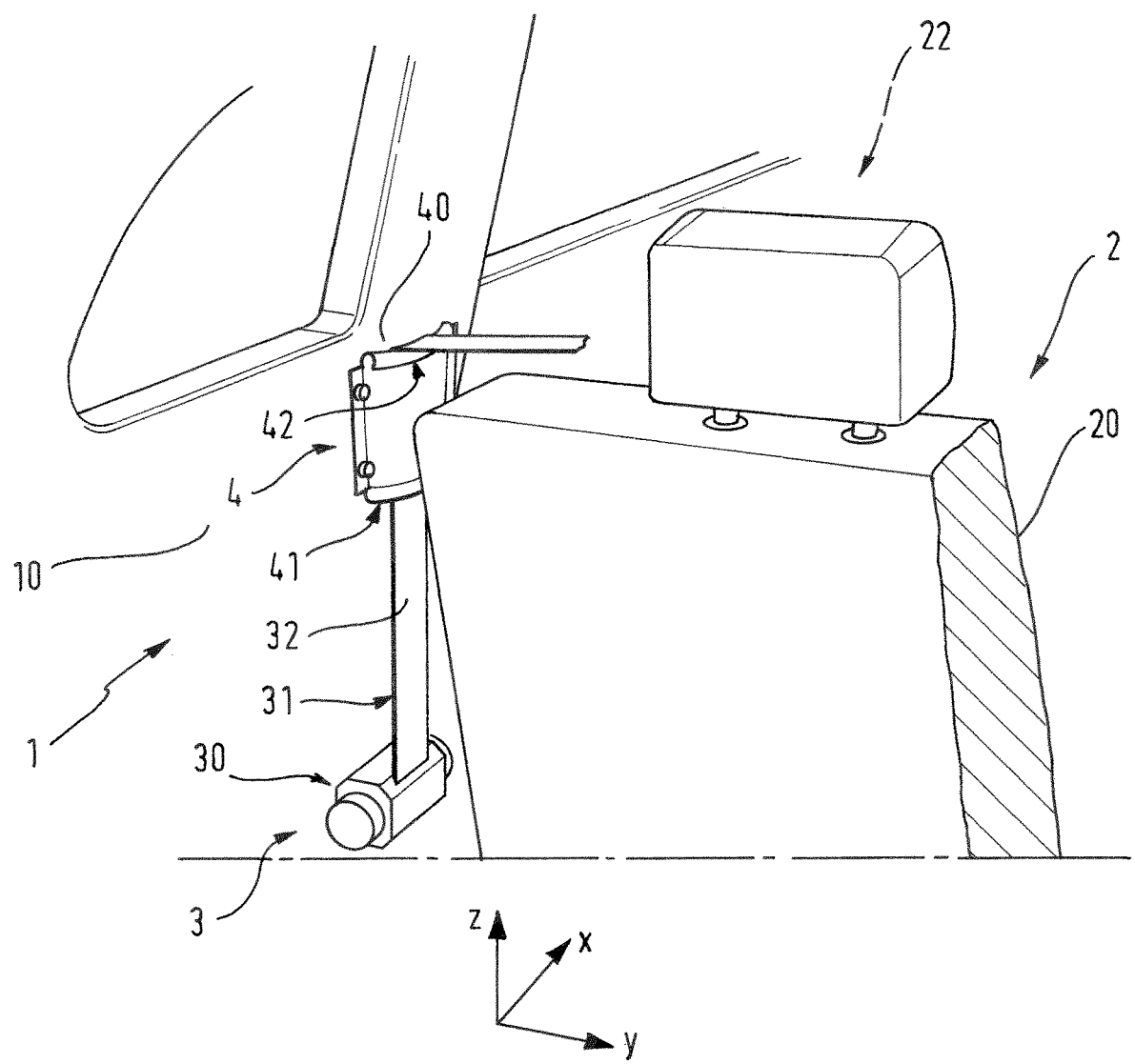
FIG. 1 is a perspective rear view of a vehicle bench seat together with a lateral body structure, in the direction of a safety belt arrangement having a deflecting device according to the invention.

FIG. 1 shows a rear view of a part of a backrest 20 of a rear bench seat 2 in a motor vehicle 1, together with a lateral vehicle structure 10. Provided on the lateral vehicle structure 10 is a safety belt arrangement 3 for the outer seat 22 of the bench seat 2 as part of a passenger restraint system. The safety belt arrangement 3 has a winding roller arrangement 30 for a belt webbing 32, said winding roller arrangement 30 being connected to the vehicle structure 10 in the lower region of the backrest 20. The winding roller arrangement 30 is embodied in the manner known to a person skilled in the art, as is conventional in 3-point automatic belts. In normal operation, the winding roller arrangement 30 allows the belt webbing 32 to be wound up and unwound, and in the event of unusual acceleration a blocking mechanism of the winding roller arrangement 30 prevents the unwinding of the belt webbing 32. In addition, the winding roller arrangement 30 can be provided with a belt tensioner device (not illustrated in FIG. 1), which retracts the belt webbing 32 by a particular amount in order to fix a person who is sitting on the associated vehicle seat and secured by the safety belt firmly to the vehicle seat in the event of an accident. The winding roller arrangement 30 can also be provided with a belt force limiter, which allows defined unwinding of the belt webbing 32 in the event of a collision, in order as a result to limit the belt force that acts on a person secured by the safety belt.

The belt webbing 32 extends upwardly from the winding roller arrangement 30, freely in the interior of the motor vehicle 1 or behind a panel (not shown) of the lateral vehicle structure 10, toward the upper end of the backrest 20. In the region of the upper end of the backrest 20, a deflecting device 4 is attached to the vehicle structure 10, said deflecting device 4 determining, together with the vehicle structure 10, a substantially vertically extending through-opening 40 for the belt webbing 32. The deflecting device 4 is curved in the form of a conical half shell, wherein the radius of curvature at the first, lower edge 41 may be smaller than the radius at the second, upper edge 42 of the deflecting device 4. The belt webbing 32 is deflected via the upper edge 42 in the direction of the backrest 20 and the shoulder of a person sitting thereon. The structure and design of the deflecting device 4 are explained in more detail below with reference to FIGS. 2 and 3.

Figure 2:
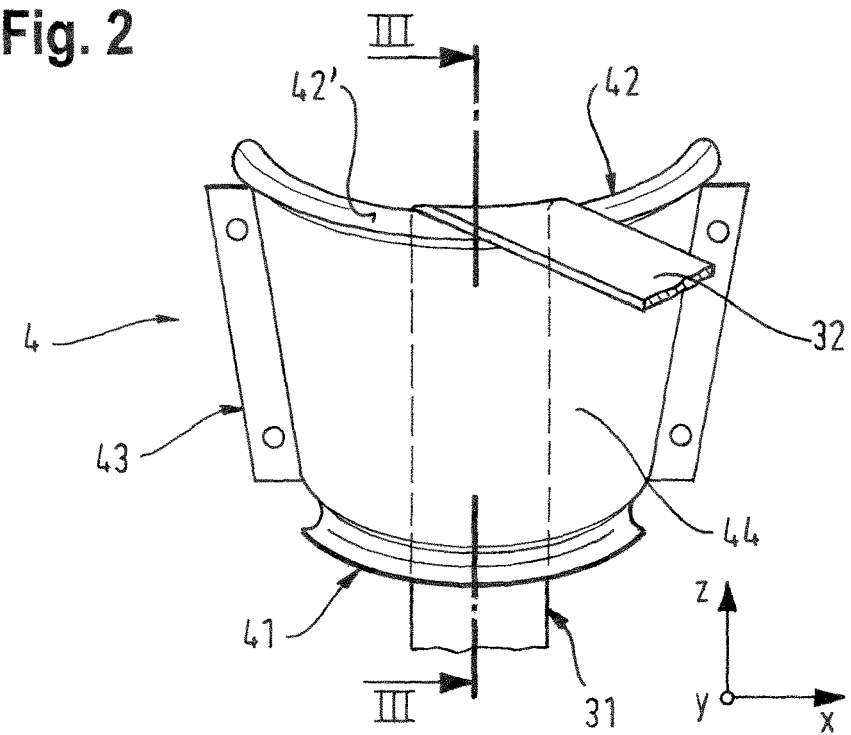
FIG. 2 is a perspective view of a deflecting device according to the invention for a safety belt.
Figure 3:
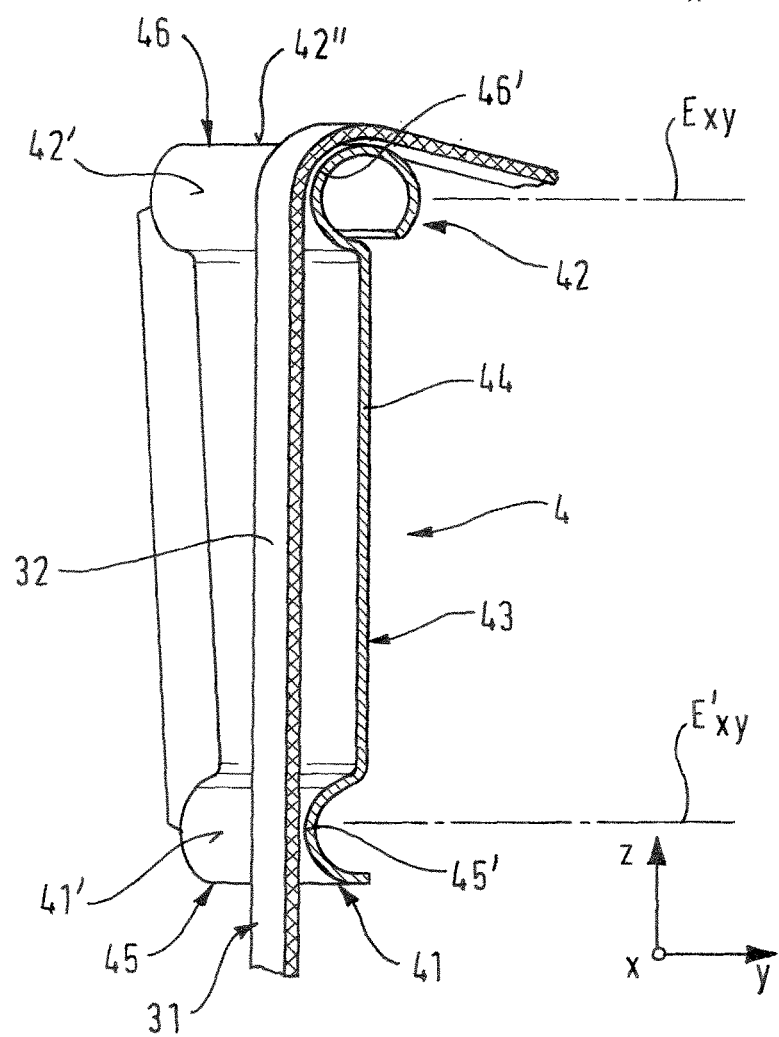
FIG. 3 is a section through the deflecting device along the line in FIG. 2.

As can be seen in FIG. 2, the deflecting device is formed as a molded part 43 made of a sheet, for example of a steel sheet, wherein this molded part 43 is preferably a deep-drawn part. This molded part 43 has a central connecting structure 44, which is in the form for example of a sheet curved about the dedicated running direction of the belt webbing 32 (FIG. 3). The upper edge 42 of the molded part 43 is in the form of a rolled edge, for which purpose the sheet of the molded part 43 was first of all bent toward the inner side of the curvature of the molded part 43 and from there bent outward with a virtually circular cross section and downwardly there, such that the upper edge 42 of the deflecting device 4 adopts the form of a slotted tube, which extends in a manner curved in a horizontal plane $E_{xy}$.

The lower edge 41 of the molded part 43 was, starting from the central connecting structure 44, first of all bent radially inward and then bend radially outward, as is apparent in the cross section in FIG. 3. The lower edge 41 of the deflecting device 4 is also in the form of a rolled edge. The lower edge 41 of the deflecting device 4 also adopts the form of a slotted tube, which extends in a manner curved in a horizontal plane $E'_{xy}$.

Both in the case of the upper edge 42 in the form of a slotted tube and in the case of the lower edge 41 in the form of a slotted tube, the respective slots face toward the outer side of the curvature of the molded part 43, i.e. the curvature of the deflecting device 4. The respective closed portions of the upper edge 42 in the form of a slotted tube and of the lower edge 41 in the form of a slotted tube therefore face toward the inner side of the curved molded part 43, i.e. toward the belt guiding side thereof, as can be seen in FIG. 3.

On its path from the bottom, the belt webbing 32 of the safety belt 31 is first of all guided up to the radially inner surface 41', with respect to the curvature of the deflecting device 4, of the lower edge 41, said surface 41' having a belt guiding portion 45' of the inner side, forming a belt run-on element 45, of the lower edge 41.

The upper edge 42 forms, on its radially inner side with respect to the curvature of the deflecting device 4, a belt deflecting element 46, which has a belt guiding portion 46' that is formed by the radially inner surface 42', with respect to the curvature of the deflecting device 4, and the upper surface 42" of the curved upper edge 42.

As can be seen particularly readily in FIG. 3, both the belt guiding portion 45' of the belt run-on element 45 and the belt guiding portion 46' of the belt deflecting element 46 protrude radially inward (with respect to the curvature of the deflecting device 4) beyond the connecting structure 44, such that the belt webbing 32 extends freely between the belt guiding portions 45' and 46' without resting on the connecting structure 44.

Both the belt guiding portion 45' of the belt run-on element 45 and the belt guiding portion 46' of the belt deflecting element 46 are polished and/or provided with a friction-reducing coating, such that the belt webbing 32 of the safety belt 31 can slide over the associated surfaces of the deflecting device 4 with minimal friction losses. The coating is in this case selected such that neither a belt force limiter that may be provided nor a belt tensioner device that may be provided are functionally impaired.

Rather than one belt run-on element 45, it is also possible for a plurality of belt run-on elements to be arranged next to one another and/or successively in the running direction of the belt webbing 32.

Figure 4:
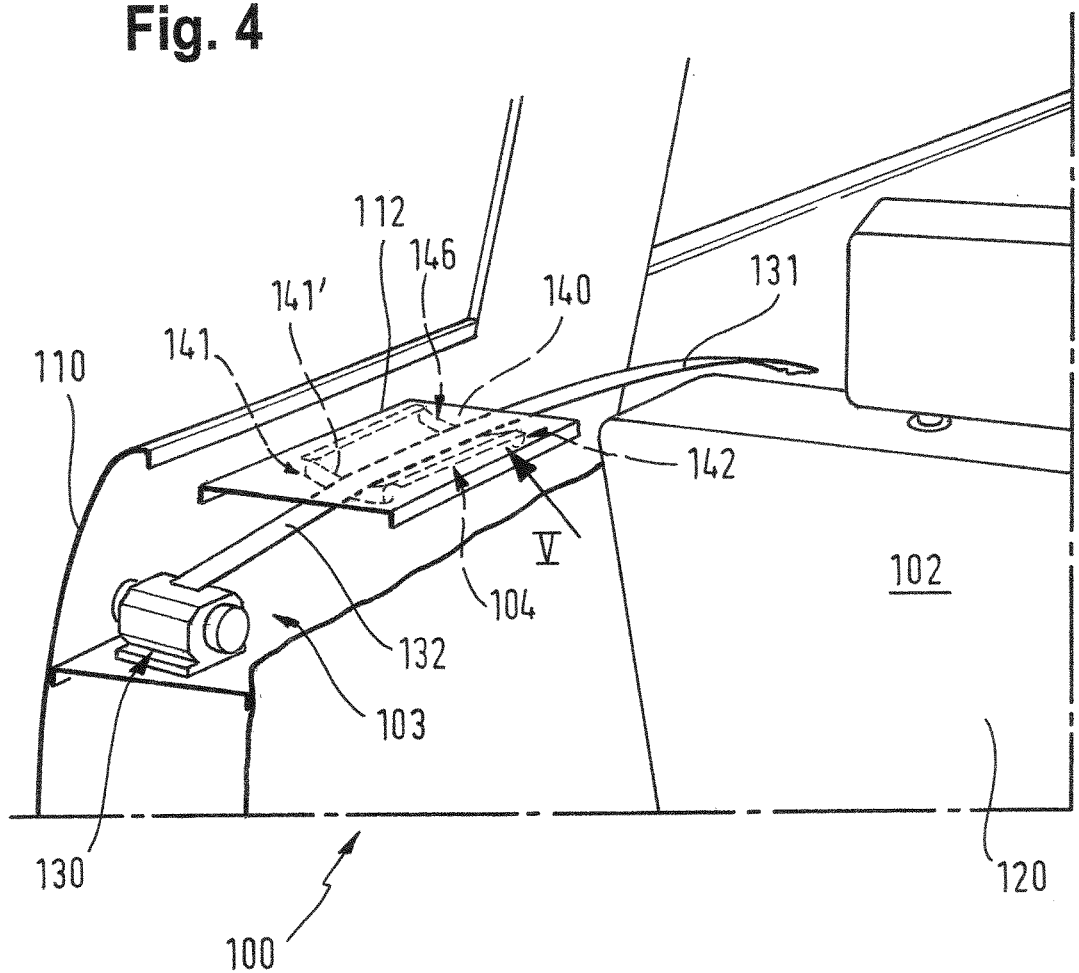
FIG. 4 is an alternative embodiment of the deflecting device according to the invention.
Figure 5:
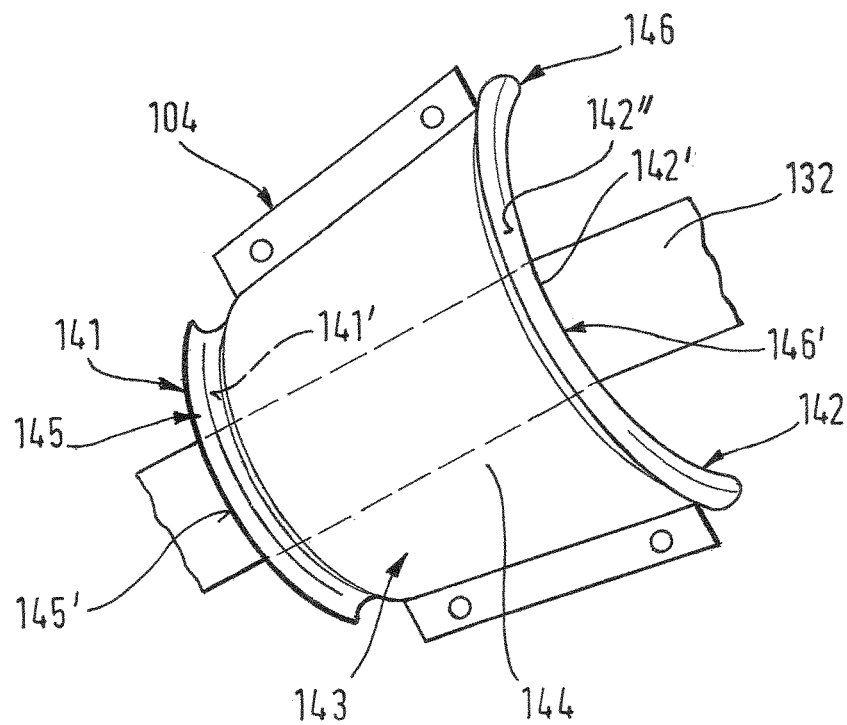
FIG. 5 is a view of the second embodiment obliquely from below.

In an alternative embodiment, illustrated in FIGS. 4 and 5, of the deflecting device 104, which is configured in principle, like the first embodiment, as a molded part 143, the through-opening 140 extends substantially horizontally or at an angle to the horizontal, as is shown in FIG. 4. The deflecting device 104 is in this case attached under or over, or on a substantially horizontally extending portion 112 of the vehicle structure 110, such that the through-opening 140 extends between the portion 112 and the deflecting device 104.

On its path from the winding roller arrangement 130, the belt webbing 132 of the safety belt 131 is first of all guided from the rear up to the radially inner surface 141', with respect to the curvature of the deflecting device 104, of the first, rear edge 141, said surface 141' having a belt guiding portion 145' of the inner side, forming a belt run-on element 145, of the rear edge 141.

The second, front edge 142, facing the backrest 120 of the bench seat 102, forms, on its radially inner side, with respect to the curvature of the deflecting device 104, a belt deflecting element 146, which has a belt guiding portion 146', which is formed by the radially inner surface 142', with respect to the curvature of the deflecting device 104, and the front surface 142" of the curved front edge 142.

The inner surface 141' of the run-on element 145, formed by the rear edge 141 of the deflecting device 104, for the belt webbing 132 and the inner surface 142' of the belt deflecting element 146, formed by the front edge 142 of the deflecting device 104, face substantially upward, toward the portion 112 of the vehicle structure 110.

In this embodiment, too, both the belt guiding portion 145' of the belt run-on element 145 and the belt guiding portion 146' of the belt deflecting element 146 protrude radially inward (with respect to the curvature of the deflecting device 4), i.e. upward here, beyond the connecting structure 144, such that the belt webbing 132 extends freely between the belt guiding portions 145' and 146' without resting on the connecting structure 144.

Figure 6:
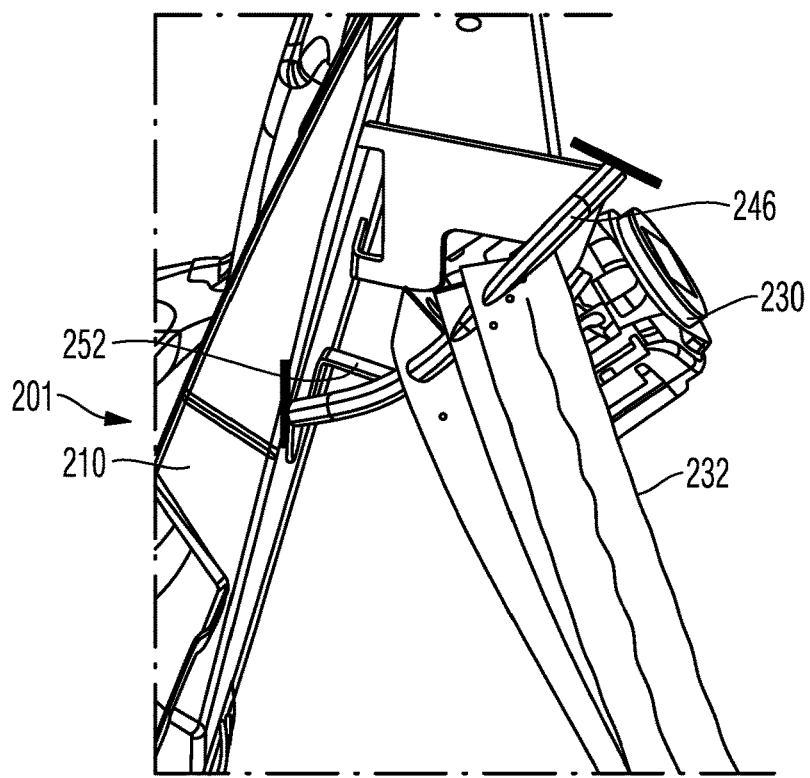
FIGS. 6 to 8 are perspective views of a third embodiment of a deflecting device according to the invention from different viewing angles.
Figure 7:
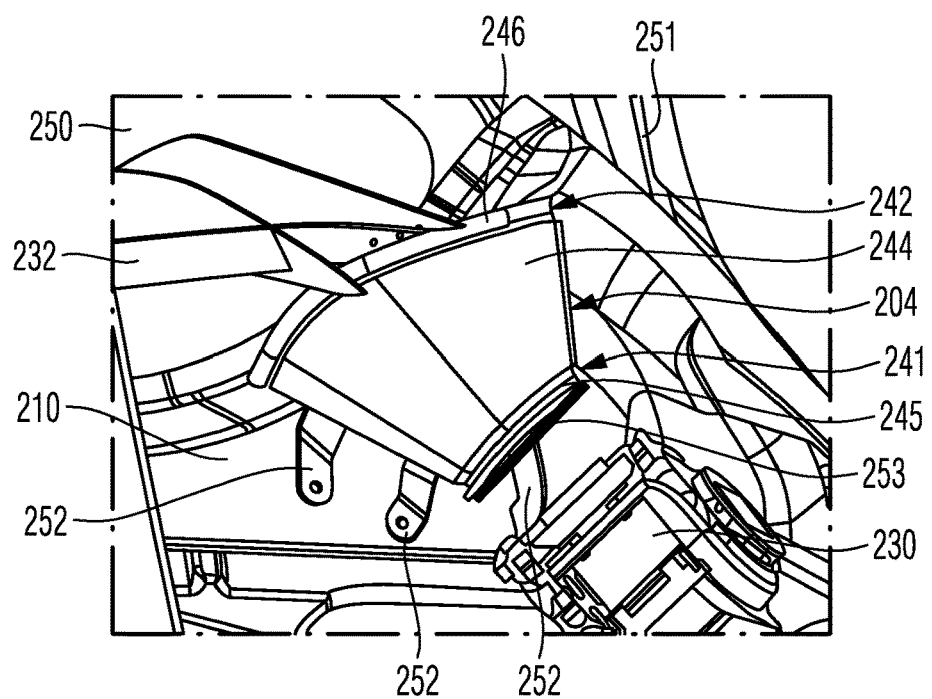
Figure 8:
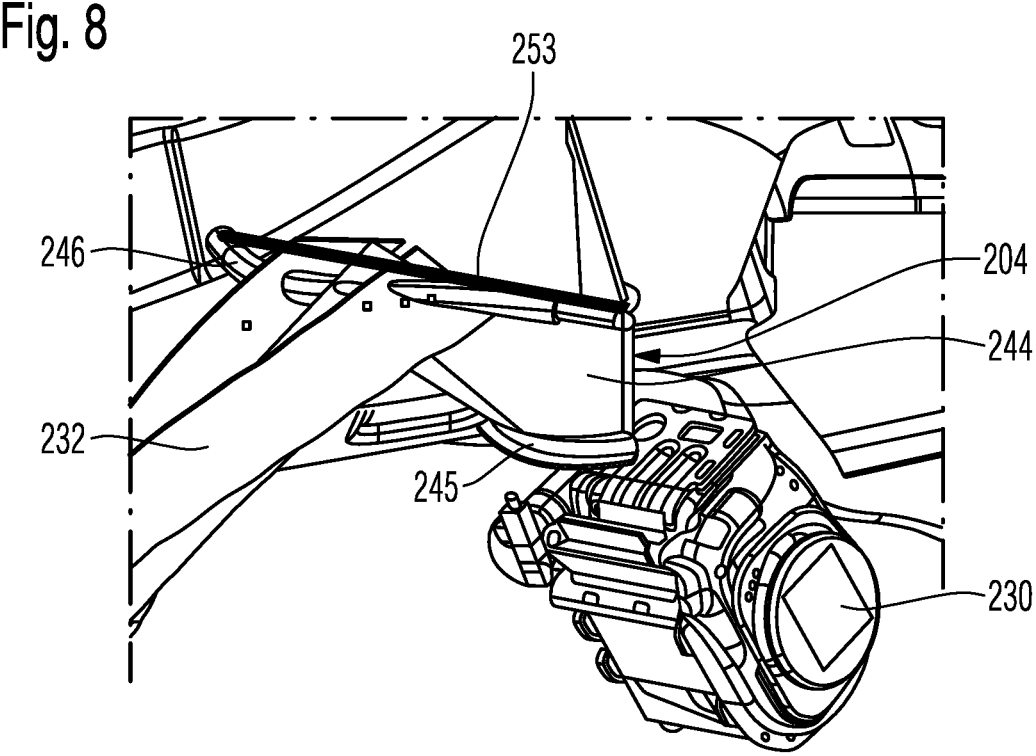
Figure 9:
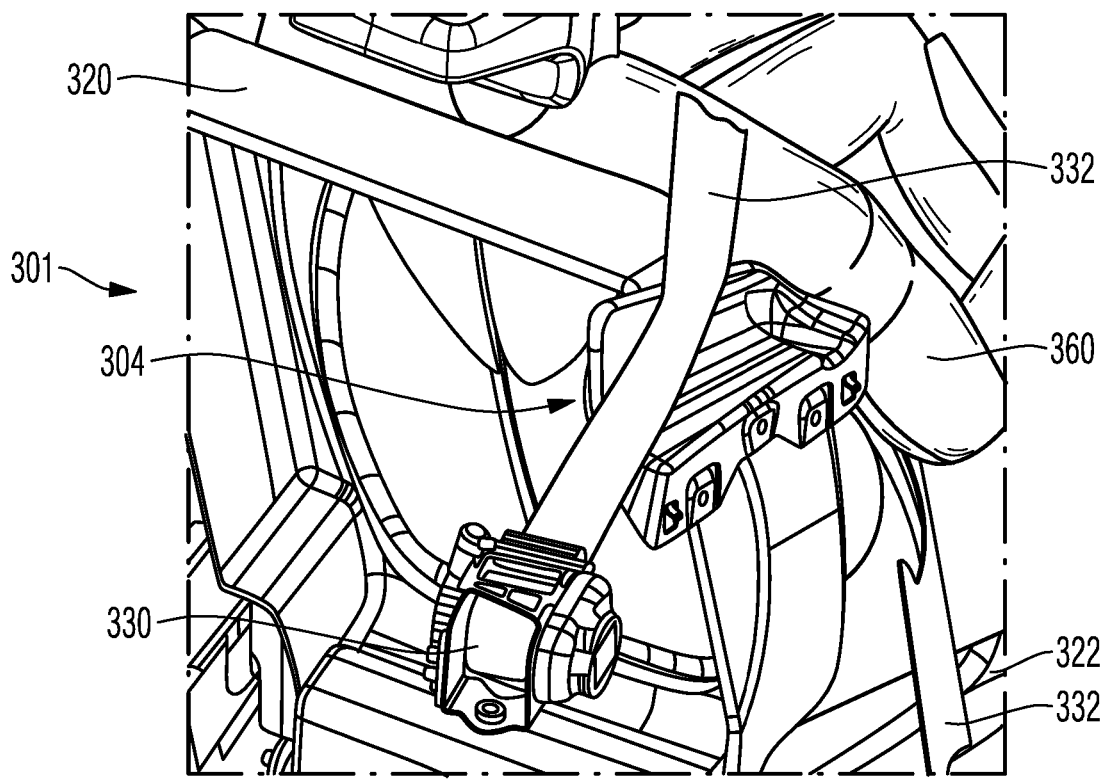
FIGS. 9 to 12 are perspective views of a fourth embodiment of a deflecting device according to the invention from different viewing angles.
Figure 10:
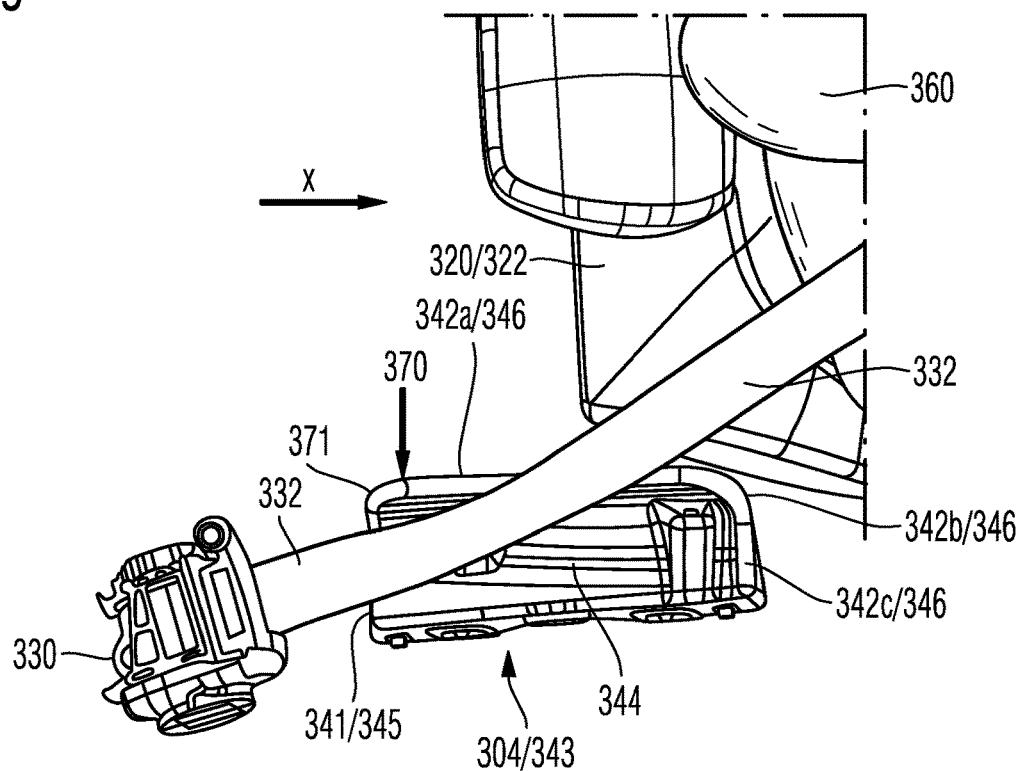
Figure 11:
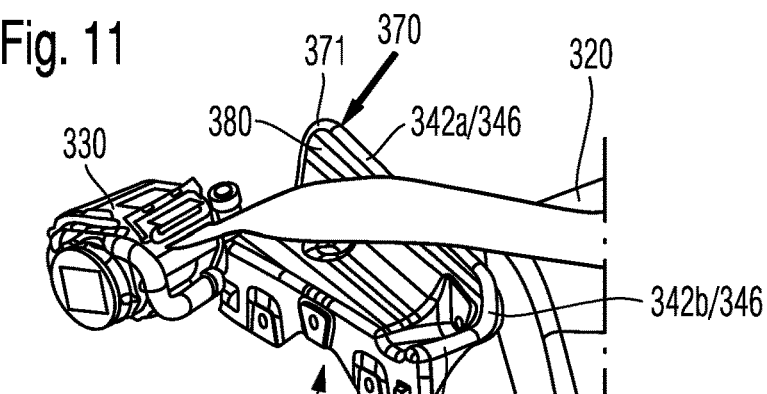
Figure 12:
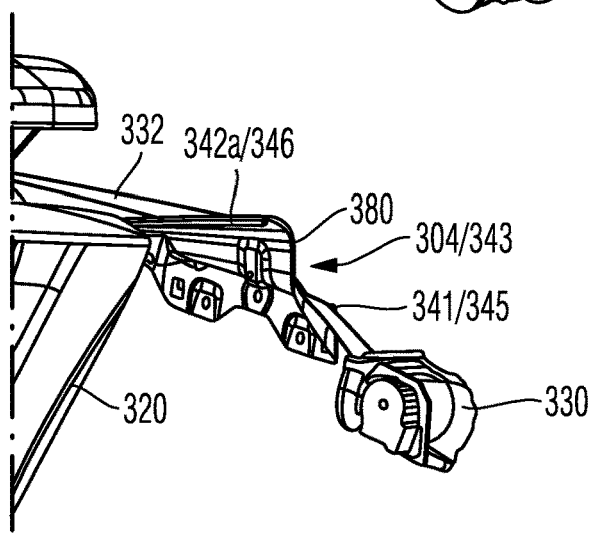

In the embodiment of the invention according to FIGS. 6 to 8, it becomes clear how the route of a belt webbing 232 can be advantageously determined by means of a deflecting device 204 that is adapted to the installation conditions of a motor vehicle 201. In this case, the orientation of the belt webbing 232—on account of the CAD illustration—is illustrated in a manner deviating from the actual orientation, namely perpendicular to the actual route.

On a lateral vehicle structure 210, having a rear side window 250 and a C-pillar 251, the deflecting device 204 is arranged beneath the "root" of the C-pillar 251. The deflecting device 204 is formed in a manner similar to a section from the lateral surface of a funnel and receives the belt webbing 232 "coming from below" with a belt run-on element 245 at the lower edge 241 of the deflecting device 204. The belt webbing 232 is guided upward along the deflecting device 204 as far as a belt deflecting element 246 at the upper edge 242 of the deflecting device 204. The belt deflecting element 246 deflects the belt webbing 232 in the direction of an occupant on a rear bench seat (not illustrated) of the motor vehicle 201.

The deflecting device 204 is in the form of a one-piece molded part and is formed for example by a deep-drawn sheet component. Provided between the belt run-on element 245 and the belt deflecting element 246 is a smooth, irregularly curved connecting structure 244, which does not come into contact with the belt webbing 232. The deflecting device 204 is fastened to the vehicle structure 210 via fastening lugs 252.

According to the invention, the belt run-on element 245 has a width that is only slightly greater than the width of the belt webbing 232, in order to ensure that the belt webbing 232 enters the deflecting device 204 as precisely as possible. To this end, the deflecting device 204 is arranged with its lower edge 241 directly adjacent to the belt outlet at the winding roller arrangement 230 and is oriented in accordance with the exit angle of the belt webbing 232 from the winding roller arrangement 230.

Likewise according to the invention, the belt deflecting element 246 has a width that is much greater than the width of the belt webbing 232, in order to allow as large an angular range as possible for the exit of the belt webbing 232 from the deflecting device 204, with the aim of guiding the belt webbing 232 optimally up to the occupant. In this way, unless the belt webbing 232 already automatically takes up a comfortable route of the belt webbing 232 as a result of the height and the stature of the occupant, the occupant can correct the route of the belt webbing 232 for a belt webbing route that is as comfortable as possible.

As is apparent in particular from FIGS. 6 and 8, the belt deflecting element 246 has, in its widthwise extension, an irregularly curved arcuate profile. As a result, a position of the belt webbing 232 that is optimized from an ergonomic point of view as it exits the deflecting device 204 is achieved, with a route of the belt webbing 232 that is comfortable to the occupant in the shoulder and thorax region. This belt webbing route sets itself automatically, as described above, but can be altered individually by the occupant by shifting the belt webbing 232 along the belt deflecting element 246, for example when the occupant adopts a sitting position other than upright.

The central axes 253 of the belt run-on element 245 and belt deflecting element 246 are arranged in a skew manner with respect to one another.

In the embodiment of the invention according to FIGS. 9 to 12, too, it becomes apparent how the route of a belt webbing 332 can be advantageously determined by means of a deflecting device 304 that is adapted to the conditions in a motor vehicle 301.

From a winding roller arrangement 330 behind a rear seat 322, the belt webbing 332 is fed to a passenger 360 via the deflecting device 304. The deflecting device 304 is formed as a molded part 343 for example made of steel sheet. Formed at the rear edge 341 of a connecting structure 344 of the deflecting device 304, which is in the form for example of a sheet curved about the running direction of the belt webbing 332, is a belt run-on element 345. A belt deflecting element 346 is formed continuously from the upper edge 342a of the deflecting device 304 to the front edge 342c, wherein the two portions 342a and 342c transition into one another via a radius 342b. As is apparent in particular from FIG. 10, the belt deflecting element 346 is L-shaped in plan view.

The belt run-on element 345 is bounded, at its vehicle-interior edge, by a wall 380 that extends approximately perpendicularly in the state installed in the motor vehicle 301. Alternatively, the lateral boundary of the belt run-on element 345 can also be brought about by an additional component (not shown) or trim component. Likewise, an additional component or trim component can be provided at the vehicle-exterior edge.

The belt deflecting element 346 "begins" terminally at the transition from a rear radius 371 into the upper edge 342a. The arrow 370 marks the rearmost position that the vehicle-interior edge of the belt webbing 332 can take up.

If the belt webbing 332 is in its set-aside position, i.e. with an unoccupied rear seat 322, it rests on the front edge 342c.

FIGS. 9 to 12 illustrate the belt webbing 332 in an approximately central position. In addition thereto, the belt webbing 332 can take up all positions between the rearmost position 370 and the set-aside position (frontmost position) against the front edge 342c.

The configuration of the belt deflecting element 346 with a comparatively elongate, substantially rectilinearly extending upper edge 342a is coordinated with the fact that the rear seat 322 is adjustable parallel to the longitudinal direction X (direction of travel) of the motor vehicle 301. In this way, the route of the belt webbing 332 can be coordinated not only with the height, stature and posture of a passenger 360 but also with different longitudinal positions of the seat 322.

Of course, this also applies, mutatis mutandis, to a backrest 320 of the seat 322 that is adjustable in terms of its inclination.

The invention is not limited to the above exemplary embodiments, which serve merely to explain the core concept of the invention in general terms. Rather, within the scope of protection, the device according to the invention can adopt other configurations than those described above. The device can in that case have in particular features that represent a combination of the respective individual features of the claims.

Reference signs in the claims, the description and the drawings serve merely for better understanding of the invention and are not intended to limit the scope of protection.

LIST OF REFERENCE SIGNS

1 Motor vehicle
2 Bench seat
3 Safety belt arrangement
4 Deflecting device
10 Vehicle structure
20 Backrest
22 Outer seat
30 Winding roller arrangement
31 Safety belt
32 Belt webbing
40 Through-opening
41 First, lower edge
41' Inner surface
42 Second, upper edge
42' Inner surface
42" Upper surface
43 Molded part
44 Central connecting structure
45 Belt run-on element
45' Lower belt guiding portion
46 Belt deflecting element
46' Upper belt guiding portion
102 Bench seat
103 Safety belt arrangement
104 Deflecting device
110 Vehicle structure
112 Portion of the vehicle structure 110
120 Backrest
130 Winding roller arrangement
131 Safety belt
132 Belt webbing
140 Through-opening
141 First, rear edge
141' Radially inner surface
142 Second, front edge
142' Radially inner surface
142" Front surface
143 Molded part
144 Connecting structure
145 Belt run-on element
145' Belt guiding portion
146 Belt deflecting element
146' Belt guiding portion
201 Motor vehicle
204 Deflecting device
210 Vehicle structure
230 Winding roller arrangement
232 Belt webbing
241 Lower edge
242 Upper edge
244 Connecting structure
245 Belt run-on element
246 Belt deflecting element
250 Side window
251 C-pillar
252 Fastening lug
253 Central axis
301 Motor vehicle
304 Deflecting device
330 Winding roller arrangement
332 Belt webbing
341 Rear edge
342a Upper edge
342b Radius
342c Front edge
343 Molded part
344 Connecting structure
345 Belt run-on element
346 Belt deflecting element
360 Passenger
370 Rearmost position
371 Rear radius
380 Wall
X Longitudinal direction

What is claimed is:

1. A deflecting device for a safety belt, comprising:
a belt deflecting element, which is configured to deflect a safety belt introduced from a first direction into a second direction, wherein
the belt deflecting element is formed on a molded part, at least one belt run-on element is provided on the molded part, said belt run-on element directing the safety belt introduced onto the molded part toward the belt deflecting element,
a width of the belt run-on element corresponds to 1 to 1.5 times a width of a belt webbing of the safety belt, and
a width of the belt deflecting element corresponds to 2 to 5 times the width of the belt webbing, the width of the belt deflecting element being defined by a path along which the safety belt is shiftable on the belt deflecting element.

2. The deflecting device according to claim 1, wherein the molded part is formed from a sheet.

3. The deflecting device according to claim 2, wherein the molded part is a deep-drawn part.

4. The deflecting device according to claim 1, wherein the belt run-on element is formed at a first edge of the molded part.

5. The deflecting device according to claim 4, wherein the first edge of the molded part is rolled.

6. The deflecting device according to claim 4, wherein the belt deflecting element is formed at a second edge of the molded part.

7. The deflecting device according to claim 6, wherein the second edge of the molded part is rolled.

8. The deflecting device according to claim 6, wherein
a central connecting structure of the molded part extends between the first rolled edge and the second rolled edge, and
at least one belt guiding portion of the belt deflecting element and at least one belt guiding portion of the belt run-on element protrude beyond the connecting structure.

9. The deflecting device according to claim 8, wherein the belt deflecting element is curved in an arcuate manner.

10. The deflecting device according to claim 1, wherein the belt deflecting element is formed in an L-shaped manner.

11. The deflecting device according to claim 1, wherein central axes of the belt run-on element and belt deflecting element extend in a skewed manner with respect to one another.

12. The deflecting device according to claim 1, wherein the safety belt is a motor vehicle safety belt.

13. A motor vehicle comprising at least one safety belt arrangement comprising a deflecting device according to claim 1.

* * * * *